(12) United States Patent
Cadamarteri et al.

(10) Patent No.: US 7,086,152 B2
(45) Date of Patent: Aug. 8, 2006

(54) ENGINE PISTON AND MANUFACTURE THEREOF

(75) Inventors: Jon Cadamarteri, Thornton (GB); Stuart Andrew Allan, Bingley (GB)

(73) Assignee: Federal-Mogul Bradford Limited (GB)

( * ) Notice: Subject to any disclaimer, the term of this patent is extended or adjusted under 35 U.S.C. 154(b) by 103 days.

(21) Appl. No.: 10/399,028

(22) PCT Filed: Oct. 8, 2001

(86) PCT No.: PCT/GB01/04463

§ 371 (c)(1),
(2), (4) Date: Apr. 7, 2003

(87) PCT Pub. No.: WO02/30601

PCT Pub. Date: Apr. 18, 2002

(65) Prior Publication Data

US 2004/0099137 A1    May 27, 2004

(51) Int. Cl.
*B23P 15/10*    (2006.01)

(52) U.S. Cl. .............................. 29/888.04; 29/888.045; 29/888.049; 29/557; 29/558; 92/158; 82/1.11; 123/193.6

(58) Field of Classification Search ............ 29/888.04, 29/888.041, 888.042, 888.045, 888.047, 29/888.049, 888.044, 557, 558; 123/193.6; 92/158; 82/1.11, 114
See application file for complete search history.

(56) References Cited

U.S. PATENT DOCUMENTS

| | | | |
|---|---|---|---|
| 2,146,774 A | 2/1939 | Snader | |
| 3,721,163 A | 3/1973 | Hill et al. | |
| 4,048,908 A * | 9/1977 | Urquhart | 92/159 |
| 4,048,975 A * | 9/1977 | Urquhart | 123/193.6 |
| 4,230,027 A * | 10/1980 | Promeyrat | 92/159 |
| 4,297,975 A * | 11/1981 | Galli | 123/193.6 |
| 4,304,410 A * | 12/1981 | Erickson et al. | 277/412 |
| 4,313,368 A * | 2/1982 | Promeyrat | 92/159 |
| 4,535,682 A * | 8/1985 | Collyear et al. | 92/153 |
| 4,752,995 A * | 6/1988 | Collyear et al. | 29/888.04 |
| 4,760,771 A * | 8/1988 | Felici et al. | 92/159 |
| 4,809,591 A * | 3/1989 | Rhodes et al. | 92/159 |
| 4,809,652 A * | 3/1989 | Essig et al. | 123/193.6 |
| 5,246,315 A | 9/1993 | Hansson et al. | |
| 5,419,223 A | 5/1995 | Kubler et al. | |

(Continued)

FOREIGN PATENT DOCUMENTS

DE    35 40 665 A1    5/1987

(Continued)

*Primary Examiner*—Essama Omgba
(74) *Attorney, Agent, or Firm*—Dickinson Wright PLLC; Robert L. Stearns (57) ABSTRACT

A method of forming a low-friction, helically ridged skirt surface of an engine piston comprises cutting a continuous groove in a piston body rotating about axis so that adjacent groove turns intersect as ridges and carry lubricating oil which forms a film on the ridged surface. The groove is cut by way of a diamond tool tip traversing along the axis. Whereas in a known, standard finish, the ridges have sharp peaks that can rupture the oil film, the tool is here modified to include a planing tip fixed spatially with respect to the tip so that after formation each ridge is planed flat to provide a plateau between groove turns that exerts less film rupturing pressure against a cylinder wall while defining a uniformly flat outer surface for the piston. The cutting may vary the piston diameter toward the ends of the body to effect barreling in which the relationship between plateau width and groove depth vary.

8 Claims, 4 Drawing Sheets

U.S. PATENT DOCUMENTS

| | | | |
|---|---|---|---|
| 6,024,542 A * | 2/2000 | Phillips et al. | 417/273 |
| 6,523,456 B1 * | 2/2003 | Kobayashi et al. | 92/158 |
| 6,666,118 B1 * | 12/2003 | Schroeder | 82/1.11 |
| 6,684,844 B1 * | 2/2004 | Wang et al. | 123/193.1 |
| 6,739,238 B1 * | 5/2004 | Ushijima et al. | 92/158 |

FOREIGN PATENT DOCUMENTS

| | | |
|---|---|---|
| EP | 0 521 598 A1 | 1/1993 |
| JP | 05149198 A * | 6/1993 |

\* cited by examiner

ENGINE PISTON AND MANUFACTURE THEREOF

TECHNICAL FIELD

This invention relates to pistons for internal combustion engines and in particular to the manufacture thereof. The invention is particularly concerned with the manufacture of pistons of relatively small dimensions for mass-market automobiles, which manufacture is subjected to cost constraints that place limits on manufacturing processes, notwithstanding the requirement for a precision machined component.

RELATED ART

It is known for a piston for an internal combustion engine to be made from the light metal alloy, typically aluminium based, as a one-piece, generally tubular body comprising a crown portion of substantially circular cross-section defined about a longitudinal axis and a hollow, open ended skirt portion extending longitudinally therefrom. The peripheral tubular wall of the crown portion carries a number of circumferentially extending, axially spaced ring grooves that locate and seal the piston for reciprocation along said longitudinal axis within the engine cylinder, but insofar as the piston is also subjected to lateral forces and thermal expansion, the skirt portion, or at least areas of it, bears against the cylinder wall to guide it.

To avoid the consequences of friction resulting from contact between relatively large areas, it has been common practice to limit the extent of surface contact by providing the tubular wall with a helical oil supply surface groove extending over at least part of its length such that oil can form a film between adjacent surface parts and the surrounding cylinder wall, although this provision is itself subject to the constraints on manufacturing economics.

Typically, for an automobile engine, a cast, or possibly forged, piston body is subjected to a series of machining steps that culminate in a precision component. Different operations are carried out by different machines each adapted for the particular operation, but it is clear that an economic process requires minimal number of different machines and a minimal, but uniform, cycle time for each machine operation (including loading and unloading) that sets throughput rate.

It has become known to combine the provision of such oil supply groove with the provision of the finished tubular surface of the piston itself, as part of a single precision machining operation that can be performed within a required short cycle time and giving the so-called European Standard Finish.

Figure 1A:
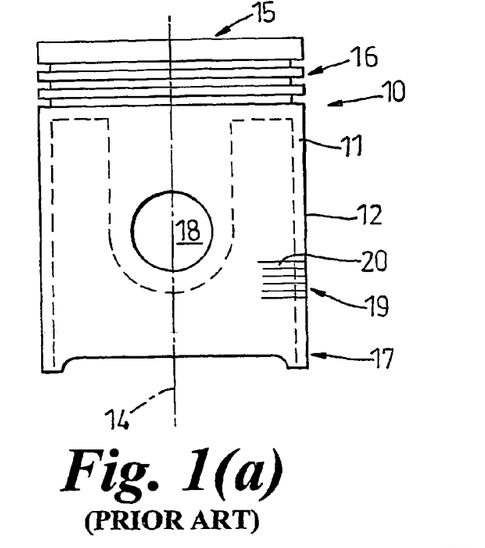
Figure 1B:
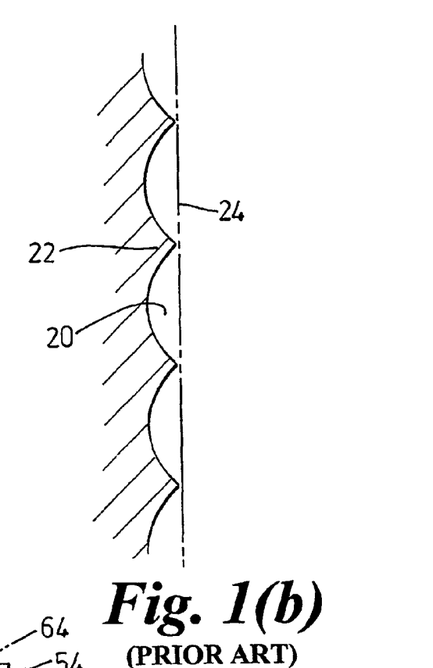

Briefly, and referring to FIGS. 1(a) and 1(b), an engine piston 10 of known design is cast from an aluminium based alloy and subjected to a number of machining steps to derive the final dimensions to close tolerances. The piston 10 comprises a unitary tubular body 11 whose tubular periphery 12 is defined about and along a longitudinal axis 14. The piston comprises a crown portion 15 that is substantially circular in cross-section (there being optionally a minor degree of ovality) having about its periphery a belt of ring grooves 16 and extending axially therefrom a hollow skirt portion 17. A pair of apertures 18 extend through the skirt portion to permit fitting of a gudgeon pin along a pin axis transversely to the longitudinal axis and at right angles to pin apertures 18 the skirt provides a thrust face 19 which during reciprication of the piston bears against a surrounding cylinder wall. In order to define the tubular surface of the piston, whilst providing lubrication of the thrust face, the body is prepared with a rough, or primary, surface and, as a final machining step, is rotated about the longitudinal axis 14 whilst a shallow helical groove 20 is cut into the primary surface with a radiused diamond tipped tool (not shown) such that adjacent turns of the groove intersect and define therebetween a sharp, or peaked, ridge 22 that forms the final outer surface of the piston. By defining the whole tubular surface in this way, any thrust area has a relatively small area to contact said cylinder wall, shown ghosted at 24, and the groove carries oil which may escape therefrom to supply the ridge peaks with an overlying lubricating film.

This European Standard Finish has the groove formed as a minor segment of the circle of relatively small radius of curvature (0.75 mm), and giving a typical groove width of 0.30 mm and depth, relative to the surface-defining ridge, of about 0.013 mm. The rotation rate, tool tip dimensions and longitudinal advancement rate are all linked to provide the groove dimensions conducive to the provision of oil to lubricate the ridges. The above technique can be implemented cost effectively for a piston of about 80 mm diameter and 100 mm length by completing it within a cycle time that is compatible with other processes to be performed; in fact it may be possible to perform two passes of the cutting tool within the available cycle time, a first pass for defining a less-rough, intermediate surface followed by a second pass at which the groove and final outer surface are defined.

However, notwithstanding the manufacturing advantages, there are drawbacks to such a tubular body surface definition. It is found that in engines where there is high combustion pressure and/or temperature and increased lateral thrust forces between side wall and surrounding cylinder, the pressure exerted by such peaked ridge finish may permit the oil film to be ruptured and metal-to-metal contact to ensue.

U.S. Pat. No. 3,721,163 appears to offer a solution to oil film rupture by manufacturing the tubular wall in a way that provides the outer surface that is flatter and more extensive (in the longitudinal direction) between groove turns, proposing machining the tubular surface of a piston by a fine tipped tool to give in the longitudinal direction an outer surface which is flat (relative to the other dimensions) and into which a helical oil supply groove is subsequently cut, but the constraints of manufacturing smaller pistons, with machining steps confined to short cycle times, make it unsuitable.

SUMMARY OF THE INVENTION

It is an object of the present invention to provide a method of, and apparatus for, forming the peripheral tubular body surface of an engine piston with a helical oil supply surface groove extending over at least part of its length in a simple and cost effective manner. It is also an object to provide an engine piston with such a defined surface.

According to a first aspect of the present invention a method of forming the peripheral tubular body surface of an engine piston defined about and along a longitudinal axis thereof with a helical oil supply surface groove extending over at least part of its length comprises 1) forming the piston body with an oversized, roughly finished wall defining a primary surface spaced from the longitudinal axis,
2) rotating the piston body about the longitudinal axis,
3) cutting into the primary surface a helical groove advanced longitudinally with such pitch that consecutive turns form therebetween a helical ridge, and 4) forming each ridge turn with a plateau of predetermined flattened shape in the longitudinal direction defining a final outer surface boundary.

Preferably the groove is advanced such that consecutive turns intersect and define a secondary surface level radially inwardly of the primary surface. The groove may be advanced such that between each groove turn a peaked ridge is formed and subsequent to its formation it is planed to define the plateau that forms the finished outer surface of the piston.

According to a second aspect of the present invention apparatus for forming the finished peripheral tubular body surface of an engine piston defined about and along a longitudinal axis thereof with a helical oil supply surface groove extending over at least part of its length, comprises means to rotate the body of a piston with an unfinished, primary surface about the longitudinal axis relative to cutting means including cutting tool means, operably disposed at the body primary surface for tangential motion relative thereto with said rotation, and cutting control means, operable to move said cutting tool means radially and longitudinally with respect to the rotation axis to cut in the primary surface a helical groove, consecutive turns of which are separated by a ridge, said cutting tool means having a convergent groove cutting tip and a substantially flat planing tip disposed in relation to the groove cutting tip to follow it in the longitudinal advancement direction and operable to plane the ridge between adjacent groove turns cut by the groove cutting tip.

According to a third aspect of the present invention an engine piston has a peripheral tubular body surface defined by a helical ridge extending about and along a longitudinal axis of the body, successive terms of the ridge being separated by a helical groove arranged to supply lubricating oil to said ridge and the surface of the ridge being planed substantially flat to define in profile a plateau extending substantially parallel to said longitudinal axis.

THE DRAWINGS

Embodiments of the present invention will now be described with reference to the accompanying drawings in which, FIG. 1(a), referred to above, is a side view of an engine piston of known form having a peripheral tubular body surface defined by a helical peaked ridge formed between consecutive turns of a oil supply groove extending over its length, FIG. 1(b), referred to above is an enlarged, and schematic, representation of part of the tubular body showing in greater detail the formation of groove and ridge.

DETAILED DESCRIPTION

Figure 2A:
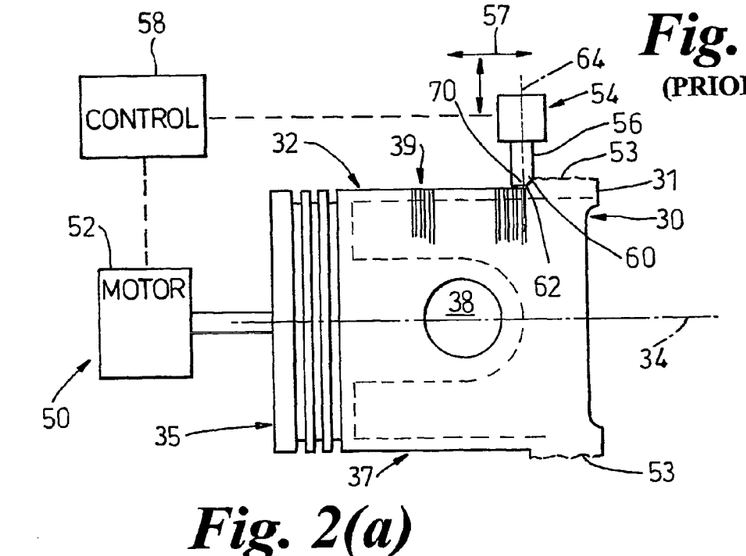
FIG. 2(a) is a side view of an engine piston in accordance with the present invention illustrating the finished tubular surface defined with and by a helical oil supply groove and inter-groove flat-topped ridge, and surface forming apparatus, including a composite groove cutting tool and ridge planing tool.
Figure 2B:
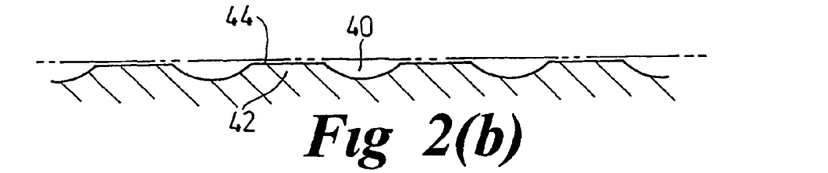
FIG. 2(b) is an enlarged, and schematic, representation of part of the tubular body of FIG. 2(a) showing in greater detail the grooved outer surface.

Referring to FIGS. 2(a) and 2(b), a piston 30 in accordance with the present invention comprises a unitary tubular body 31 whose tubular periphery 32 is defined around and along longitudinal axis 34. The piston body comprises crown portion 35, into which endless ring grooves are cut, and skirt portion 37 closed at one, crown end but open at the opposite end and which extends transversely gudgeon pin aperture 38. The periphery of the tubular body surface includes thrust region 39.

The tubular surface 32, and particularly the thrust area, is defined between consecutive turns of a helical groove 40 by a helically extending ridge 42. The helical groove is shallow and able to hold lubricating oil, successive turns of the groove being arranged to supply oil to the top surface 44 of the ridge and this ridge surface, at least in relation to each bounding groove turn, is planed substantially flat to define in profile a plateau extending substantially parallel to the longitudinal axis 34.

Although for convenience illustrated only at the central region of the piston length, the helical ridge and groove arrangement that defines the tubular body surface extends from one end of the piston body to the other. For ease of understanding the following explanation concentrates on such uniformity, with variants described later.

The finished peripheral surface is provided as one of a number of manufacturing operations, as in well known in producing the aforementioned Standard finish, and FIG. 2(a) also shows schematically apparatus 50 according to the invention for forming the finished surface.

The apparatus comprises motor means 52 for rotating a piston body with an unfinished, primary surface, illustrate by dotted line 53, about the longitudinal axis 34 and relative to cutting means, indicated generally at 54, which is stationary in respect of rotation. The cutting means includes cutting tool means 56, which is disposed at the primary surface of the body for longitudinal motion relative to the surface as the latter rotates, and cutting control means 58 which is operable to move the cutting tool radially and longitudinally with respect to the rotation axis. The cutting control means operates in conjunction with motor means 52 to cut a groove in the rotating primary surface and advance it longitudinally along the rotation axis in direction 57 to effect the helical groove 40 and ridge 42.

The cutting tool means 56 comprises a groove cutting tool formed by a groove cutting tip 60, converging to an apex 62 through which extends a tool tip axis 64 in said radial direction, and a planing tool formed by a planing tip 70 disposed in relation to the groove cutting tip to follow it in the longitudinal advancement direction to plane the ridge between adjacent groove turns to define the flat plateau surface 44 of consecutive turns of the ridge that comprises the outer extent, or overall diameter, of finished body surface 32.

The cutting tool means and its operation is described in greater detail below with reference to FIGS. 4(*a*) and 4(*b*). Firstly however, reference is made to the schematic FIG. 3 which illustrates the method, in accordance with the invention and not limited to the apparatus, by which the finished peripheral tubular body surface is defined.

Figure 3:
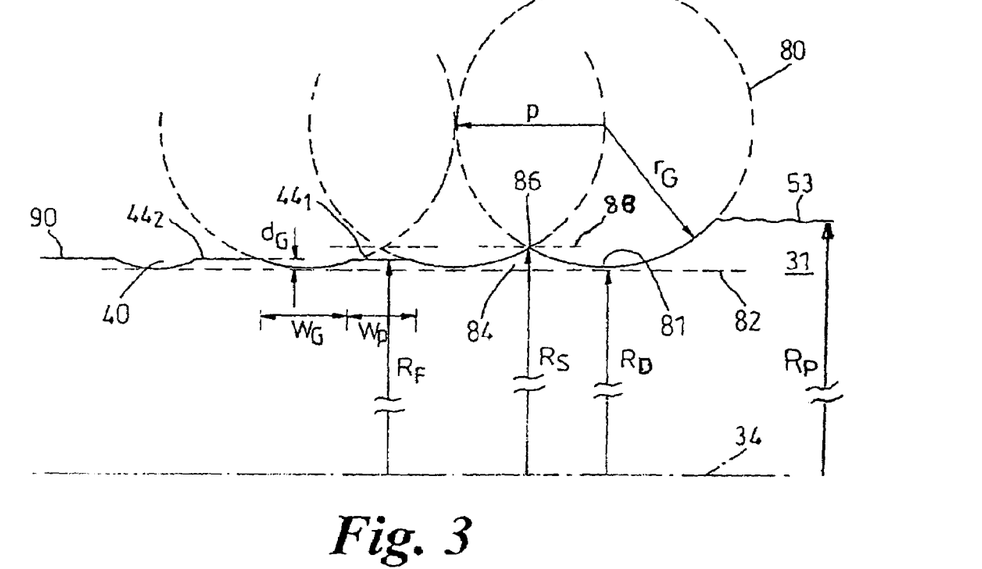
FIG. 3 is a schematic representation of one, preferred method according to the invention for forming the surface.

The tubular piston body 31 is formed with a tubular wall, that is oversized and roughly finished defining a primary surface 53 spaced from the longitudinal axis 34 by a nominal radial distance $R_P$ and the piston body is mounted to rotate about this longitudinal axis.

A shallow groove 40 of part circular cross-section, that is, an arc of a circle 80 of radius $r_G$, is cut into the rotating primary surface such that a conveniently definable part, such as the apex 81, represents the groove floor.

A cutting datum, in this case a groove floor datum 82, is defined at radius $R_D$ and the groove is cut into the primary surface to the radial level of the groove floor datum and the groove cutting advances longitudinally along axis 34 following this datum and notwithstanding irregularities in the primary surface.

The groove radius $r_G$ and longitudinal advancement rate are chosen with respect to the body rotation rate such that consecutive turns intersect and form therebetween a peaked ridge 84 defining (at the peak 86) a secondary surface level, indicated at 88 radially inwardly of the primary surface, the secondary surface level being at radius $R_S$, where $R_S < R_P$.

Notwithstanding the formation of a continuous groove and therebetween a continuous ridge, it is convenient to contemplate the surface as being, in any longitudinal plane including the surface and longitudinal axis, a series of grooves and inter-groove ridges and reference to "groove" and "ridge" hereinafter are within this context.

In accordance with the method of the invention each peaked ridge 84 that is formed by the intersection of consecutive groove turns is planed subsequently to its formation to give a plateau of flattened shape in the longitudinal direction across the ridge, as shown at $44_1$, $44_2$, . . . , whereby the plateaux define a finished outer surface boundary 90 at radius $R_F$ from the rotation axis, where $R_F < R_S < R_P$. Most conveniently, the plateau is defined for planing at a predetermined distance from the groove floor datum and defining groove depth $d_G$ as $(R_F - R_D)$ so that other dimensions of the ridge are in fixed relationship with those of the groove.

After the formation of the plateaux, the finished surface comprises alternately a ridge plateau of width $w_P$ and groove of width $w_G$ which combine to equal the groove pitch p.

It will be seen that insofar as the groove forms part of a circle radius $r_G$, the groove width is a chord of the circle and related to groove depth $d_G$, so that groove depth, groove width and plateau width are related by the radius of curvature and pitch.

In a particular example, that FIG. 3 illustrates, the groove pitch p is equal to the radius of curvature $r_G$, so that $w_G + w_P = r_G$ and groove depth $d_G = r_G - (r_G^2 - (\frac{1}{2}w_G)^2)^{1/2}$.

By choosing $w_G = w_P$, then $w_G = \frac{1}{2}r_G$ and $$d_G = r_G - (r_G^2 - r_G^2/16)^{1/2}$$
$$d_G = r_G - (15/16\, r_G^2)^{1/2}$$
$$d_G = r_G - r_G\sqrt{15/16}$$

or $d_G = 0.0318\, r_G$

As exemplary values, the pitch p and radius of curvature $r_G$ may be 0.4 mm, giving a groove and plateau width of 0.2 mm and groove depth of 0.013 mm, that is, the same groove depth as the Standard finish.

Preferably, the oil supply groove has a groove depth less than 0.025 mm, repetition pitch of less than 0.75 mm, and the ridge plateau width less than 0.25 mm.

It will be seen that the relationship between $d_G$ and $r_G$ makes it convenient to define the ridge plateau relative to the groove floor datum; that is, in accordance with the above relationship, by defining the pitch p, groove curvature $r_G$ and groove/plateau depth $(R_F = d_G + R_D)$ for planing the inter-groove ridge, it follows that the groove and plateau widths are defined.

As mentioned above, each peaked ridge is planed to produce said plateau after the ridge is formed. Although the groove cutting and ridge planing may be done at separate times, it is preferable that they occur together, even if displaced spatially. Thus to further define the method outlined above by planing the peaked ridge turn after it is formed, planing is effected displaced about the longitudinal axis from the groove cutting. In practice it is convenient to effect groove cutting and ridge planing disposed with respect to each other in a longitudinal plane, that is, a plane including the longitudinal axis such as the plane of the Figure, so that the rotational offset between formation of peaked ridge 84 and planing to obtain plateau $44_1$, is substantially equal to 360° or a multiple thereof.

Figure 4A:
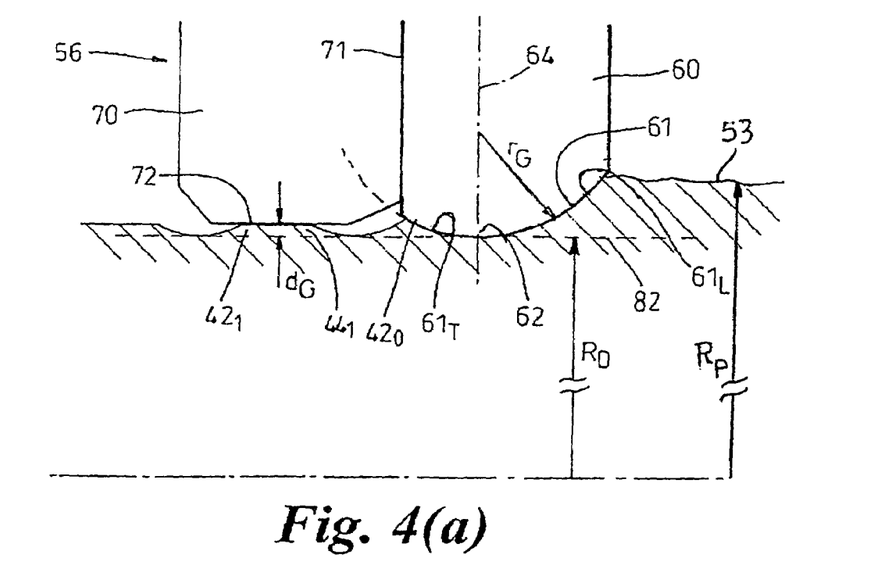
FIG. 4(a) is a sectional elevation through part of the piston forming apparatus of FIG. 2(a) illustrating in greater detail the composite cutting tool for forming the groove and planed ridge that define the outer surface, in accordance with the method illustrated by FIG. 3.
Figure 4B:
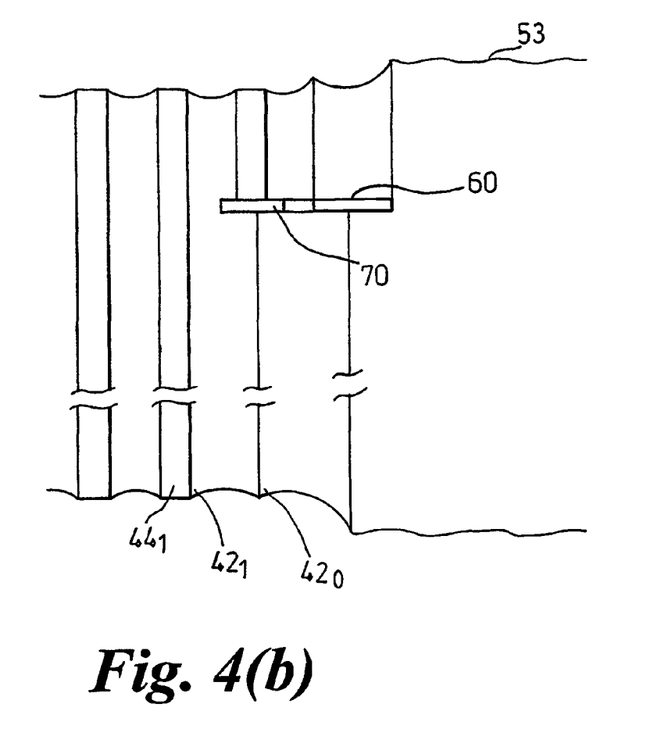
FIG. 4(b) is an orthogonal view of the apparatus of FIG. 4(a) showing the cutting tool in plan view and illustrating operation.

Referring to FIGS. 4(*a*) and 4(*b*), the former shows an enlarged portion of the cutting arrangement 50 of FIG. 2(*a*) and the latter a highly schematic plan view to illustrate the geometry of the applied method. The cutting tool means 56 comprises a diamond groove cutting tip 60 having a part spherical tip of radius $r_G$ that defines an arcuate cutting face 61 for cutting a groove in the primary surface 53. The tool tip axis 64 is orientated to extend in a direction radially with respect to the rotation axis 34 such that the floor of the groove is effected by the tool tip apex 62. The control means 58 (of FIG. 2(*a*)) is arranged to monitor the rotation rate of the piston body about axis 34 and advance the cutting tool means along the rotation axis at a rate that defines pitch length $p = r_G$. The control means is also arranged define the radial level of groove floor datum 82 ($= R_D$) to maintain the tool tip apex 62 at this position as the groove is cut.

Notwithstanding that the tool moves primarily in a direction relative to the rotating body that is out of the plane of the Figure, it also advances longitudinally within the plane and to this end the arcuate cutting face 61 may be considered to have a leading side $61_L$ to one side of the tool tip axis with which it cuts relatively deeply into the primary surface and a trailing side $61_T$ to the other side of the tool axis with which it cuts less deeply by intersecting a previously cut groove turn.

The trailing side of the groove cutting tool tip is truncated in the direction along axis 34 relative to the trailing side and extends in the direction of longitudinal axis 34 for slightly more than half of the pitch length and, insofar as in this example the pitch length is equal to the radius of curvature, the trailing side $61_T$ of the tool tip extends in the direction of longitudinal axis 34 for slightly more than half of the radius of curvature $r_G$.

The planing tip 70 is also diamond and joined to the groove cutting tip, adjacent the trailing side thereof along an interface 71 defined substantially parallel to the tool tip axis 64 to provide a composite tool tip in which the dimensions and spatial relationships are fixed with respect to each other throughout operation. The planing tool tip has a planing edge 72 that is flat and extends so that in operation it is in the direction of the longitudinal axis and perpendicular to the tool tip axis 64. The planing edge 72 is spaced from the apex 62 of the groove cutting tip along the tool tip axis 64 by the desired final groove depth $d_G$ relative to the groove floor datum, in this example approximately 0.03 times the radius of curvature of the groove cutting tip. The planing edge itself is displaced from the groove cutting tip apex longitudinally by an integral number of groove pitch lengths, in this case one, so that it commences at a distance p therefrom and has a length approximately equal to the groove pitch p, or approximately twice the ridge plateau width wp to be formed, and thereby centred approximately 1.5 times the groove pitch p from apex 62.

Thus in operation, as the groove cutting tip 60 is advanced both about and along the longitudinal, rotation axis of the piston body and controlled to maintain its apex at the predetermined groove floor datum, the currently cut groove turn intersects with the preceding turn, defining a peaked ridge $42_0$ therebetween, and simultaneously therewith the planing tip planes the ridge $42_1$ formed between that preceding groove turn and the turn before that in the same longitudinal plane to give it a flat plateau $44_1$.

It will be appreciated that as long as the planing tip extends longitudinally for at least the plateau width required, any excess length is immaterial, providing it does not interfere with the newly formed peaked ridge. Likewise, provided that the trailing side of the groove cutting tip extends beyond the level of intersection with the previously cut groove any further extent is immaterial. Therefore there is a considerable tolerance in respect of joining the groove cutting and planing tips, permitting the interface at 71 to focus on achieving accuracy for the planing edge and displacement $d_G$ between it and the cutting tool apex.

The composite cutting tool, insofar at the planing tip occupies space not required at the trailing side of the groove cutting tip, may be made compact and operate with the conventional controlled groove cutting equipment which is already set up to define a groove pitch and groove floor datum and cut the groove to the defined values. Also, as seen above, the planing follows as defined by the tool.

In the simplest piston body form as described, the composite cutting tool is advanced from end to end such that the groove cutting tip engages the one end of the body before the trailing planing tip and the planing tip finishes planing the other end after the groove cutting tip has left the body, the result effected being a longitudinally flat, planed cylindrical surface in which is cut a groove of constant depth.

It will be appreciated that in general, it is desired for the body wall to depart from radial uniformity about the longitudinal axis, being given a small degree of ovality achieved by varying the radial position $R_D$ of the groove floor datum as a function of angular position during rotation. Clearly, by having a composite tool in which the groove cutting tip and planing tip are in the same longitudinal plane then the conventional modulation of the radial position of the groove floor as a function of rotation will produce ovality whilst preserving the radial relationship between groove and ridge plateau.

In respect of departures from uniformity in the longitudinal direction, it is common to have at one or both ends of the tubular body a smooth decrease in overall diameter of the finished outer tubular surface as the surface converges towards the longitudinal, rotation axis 34. When present at both ends, as illustrated schematically and exaggerated in FIG. 5, it provides a characteristic barrelling. Whereas with a simple spherical groove cutting tip the effect of reducing the radius $R_D$ of the groove floor datum during groove cutting produces such change in overall radius with little more than a distortion of the groove profile as successive ridge peaks become higher or lower, depending upon the direction of groove advancement, the composite tool 56 has a more complex, but nevertheless beneficial, function.

Figure 5:
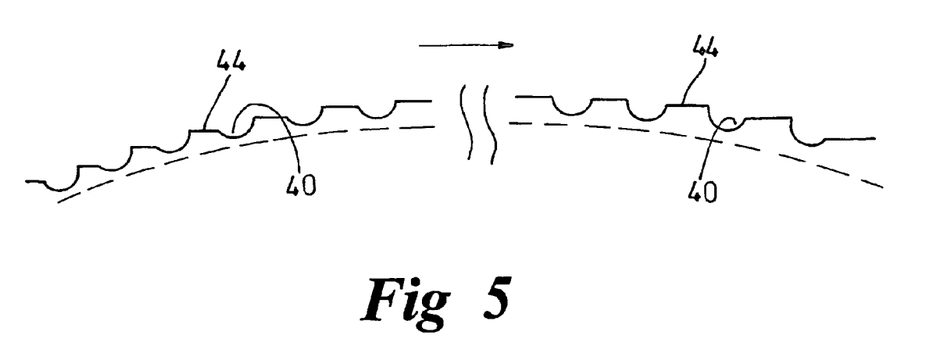
FIG. 5 is an enlarged sectional elevation view through end regions of the tubular body of FIG. 2(a) illustrating the groove and ridge relationships formed at tapered or barrelled ends of the body by the apparatus with composite tool of FIGS. 4(a) and 4(b)

In FIG. 5 the crown end of the tubular side wall is to the left of the figure and the open ended skirt portion to the right. The oil supply groove is cut helically from the crown end towards the skirt end using the tool 56 of FIG. 4(a), and retaining its orientation throughout the cutting operation with the planing tip parallel to the rotation axis.

It will be appreciated that in the direction of cutting, at the crown end the groove floor datum effectively slopes away from the rotation axis with cutting and in any particular longitudinal plane the groove turns are wider and deeper and plateaux shorter, although this departure from equality lessens as the groove floor datum tends to become parallel to the rotation axis. Conversely, at the other end of the body wall, the groove floor datum slopes down towards the rotation axis and in doing so effects a lengthening, and lowering, of succeeding ridge plateaux. It is found in practice that this is beneficial in respect of reducing contact area towards the crown of the piston (for lowest friction under light transverse loads) whilst increasing the contact area towards the skirt end (for greater support under heavy transverse loads). However, it will be seen that such barrelling effect may be produced running in the direction from open skirt end to crown end if desired, with plateaux shortening at the open skirt end.

There are variations to the above described method of forming the piston outer tubular surface and to the apparatus, some of which are integrated and some of which are independent.

The above described method of cutting the final outer surface at barrelled ends of the tubular body, wherein the tool axis is maintained perpendicular to the rotation axis and produces variations in groove depth and width that results in the variations in ridge width, may be varied such that the tool follows changes in the radius of the groove floor datum by inclining the tool tip axis 64 with respect to the rotation axis so that it remains perpendicular to the local slope of the floor datum 82. Alternatively, the groove pitch and/or rotation rate could be varied to maintain a constant ridge plateau length.

Figure 6:
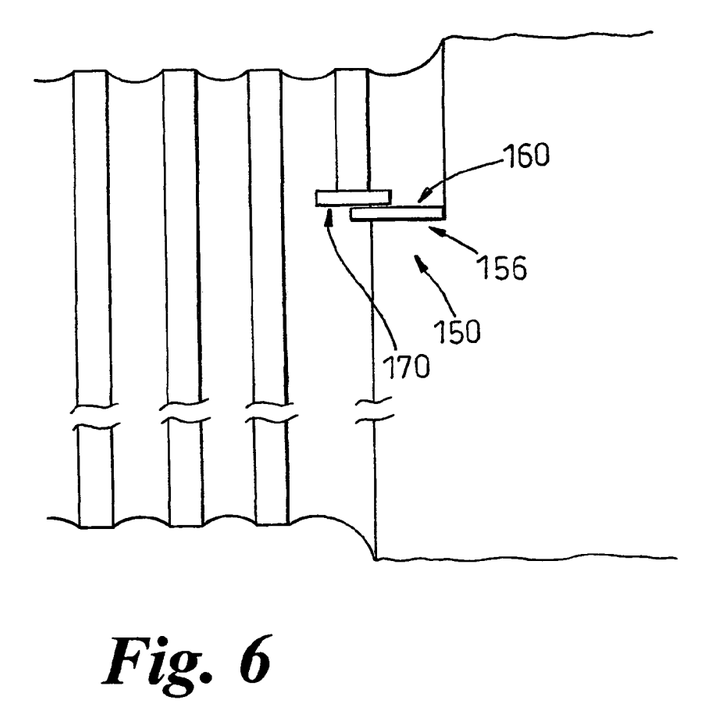
FIG. 6 is a schematic view, similar to that of FIG. 4(b), but of a second embodiment of piston forming apparatus in accordance with the invention having a different form of composite cutting tool.

Referring to FIG. 6, this illustrates, in a sectional plan view corresponding to FIG. 4(b), forming apparatus 150 having cutting tool means 156 comprising a composite groove cutting tip 160 and ridge planing tip 170 in which the planing tool is not in the same longitudinal plane as the groove cutting tip but is displaced therefrom circumferentially and overlaps it longitudinally so that it planes the most recently formed peaked ridge immediately following its formation.

It will be appreciated that such an arrangement has a less marked effect at the ends of the body in producing barrelling, but has some effect in producing ovality. That is, if there is a variation in groove floor level during rotation, then as the groove floor datum falls towards the rotation axis, the height of the plateau being planed in respect of an earlier cut part of that groove is correspondingly lowered relative to the groove datum when that part was cut, and vice versa as the groove floor datum rises away from the rotation axis. In such circumstance it is possible to program the control means 58 in accordance with the radial and circumferential offset between the tool tips, in effect define the cutting datum with respect to the desired outer surface, so as to provide the ridge plateau to the relevant dimensions of an oval surface with a relative variation in groove depth circumferentially. However, the rate of change is small and if the tool cutting tips are close together, the variation between groove floor and ridge plateau may be ignored.

It will be appreciated that in the tip arrangement of cutting tool means 156 illustrated in FIG. 6 the planing tip may be displaced circumferentially further from the groove cutting tip.

Similarly, in the co-planar arrangement illustrated in FIG. 4(*a*), it will be appreciated that the planing tip 70 may be displaced by a greater multiple of groove pitch length from the groove cutting tip 60, the principal effect of this in a composite tool being physically a loss of compactness and functionally in relation to defining tapered or barrelled ends, but nevertheless practicable.

In the embodiments thus far described, the cutting tool is a composite item in which separate tips 60 and 70 move as a unitary item, advantageously permitting the employment of existing controlled apparatus with only the combination of cutting bps being new and control continuing to be exerted on that one combination of tip only. It will be appreciated that the groove cutting tip 60 and planing tip 70 may be provided separately and separately controlled in respect of their instantaneous positions relative to the rotation axis and accommodating longitudinal and circumferential offsets, but nevertheless following the method of defining the outer surface by effectively cutting a helical groove relative to a defined datum.

It will be appreciated that insofar as the planing tip removes extraneous metal not removed by the groove cutting tip, there is greater flexibility in choosing how the consecutive groove turns intersect, including the possibility of increasing the radius of curvature of the groove and/or its pitch. Thus whereas in the Standard finish the final surface is defined by the geometry of the intersecting groove turns, by the method of the invention the inter-groove peaks may be defined higher as a result of increasing groove pitch, even to the extent of defining a notional ridge above the level of the primary surface, providing this is within the capacity of the planing tool tip to remove whatever ridge peak does exist to define the desired ridge plateau relative to the groove floor. One effect of defining groove turns at greater pitch may be a reduction in the time for machining from end to end of the piston.

It will be appreciated that it is convenient to have a groove profile that is an arc of a circle, for the purposes illustration and compatibility with known practises. However, insofar as it is desired that the groove serves to supply oil to the adjacent ridge plateau, the groove may take any other profile that defines an inter-groove ridge capable of being planed by a tool coupled physically or functionally to the groove cutting tool, for example of the types shown in the aforementioned U.S. Pat. No. 3,721,163, although there is a preference for a groove profile that avoids sharp corners from which cracks could propagate.

Figure 7:
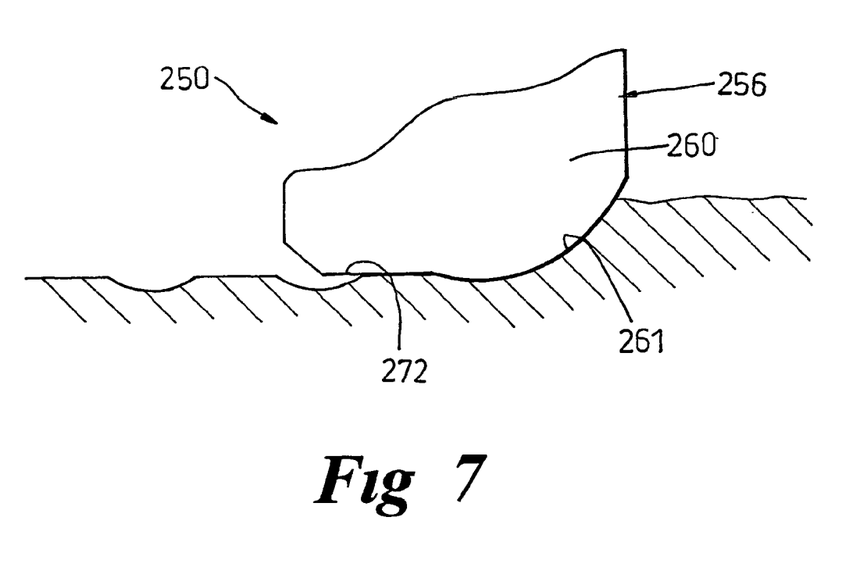
FIG. 7 is a schematic view, similar to that of FIG. 4(a), but of a third embodiment of piston forming apparatus in accordance with the present invention having yet a different form of cutting tool.

Although embodiments of a composite cutting tool have been shown, and represent a combination of constructional simplicity and efficient operation from discrete tool tips, it is possible to define, as illustrated in FIG. 7, apparatus 250 includes cutting tool means 256 having integrally in a single spoon-shaped tip 260 a groove cutting face 261 and planing edge 272 that cuts both the current section of groove from the primary surface and simultaneously planes the wall metal to intersect the preceding groove turn as a planed ridge.

The method described above, which is independent of precise apparatus construction, and the apparatus embodiments described in detail based upon existing form and operation, emphasise the defining of a cutting datum as a groove floor datum and cutting of a groove to this datum from which the planed ridge surface that is the finished tubular body surface is achieved. It will be appreciated that with the apparatus 50, 150 and 250 the cutting datum may be defined as the desired tubular surface finish and the control means programmed to cut into the surface with the planing tip to such level, it being incidental that the groove cutting tip actually defines the locus of a groove floor datum offset radially therefrom.

Although the above description has related to the helical groove and ridge combination extending for the full length of the piston body, it will be appreciated that it may be defined according to the method, and by the apparatus, of the present invention along only part of the body length.

As mentioned above, in relation to the provision of barrelling, the pitch length may be varied throughout the cutting of the groove to vary the ridge plateau length independently of any change in radial position.

Also, although the apparatus described above has been described by diamond cutting tips, it will be appreciated that tips formed from other suitable materials may be employed. Whilst the method and apparatus is particularly suited for use with relatively small cast alloy piston bodies, it is not limited thereto and may be employed with different body sizes and materials.

Likewise, it will be appreciated that the composite (or integral) tool may be operated in the same manner as the standard groove cutting tool in respect of making two oppositely directed passes over the roughly formed surface, the first being a preliminary pass to effect a more uniform definition of the primary surface for the second pass that defines the final surface discussed above.

The invention claimed is:

1. A method of forming a peripheral tubular body surface of an engine piston defined about and along a longitudinal axis thereof with a helical oil supply surface groove extending over at least part of its length, the method comprising:

forming the piston body with an oversized, roughly finished wall defining a primary surface spaced from the longitudinal axis;

rotating the piston body about the longitudinal axis; relative to a cutting tool, during said rotation, cutting into the primary surface to define a helical groove advanced longitudinally with such pitch that consecutive turns form therebetween a helical ridge having corresponding consecutive turns;

for each ridge turn between said defined groove turns, removing the piston body material to form a plateau of predetermined flattened shape in the longitudinal direction defining a final outer sur&ce boundary of the tubular body surface of the engine piston, wherein the piston body material is removed by planning and wherin proove cutting and ridge planning is effected simultaneously.

2. A method as claimed in claim 1 comprising cutting and advancing the helical groove such that the consecutive groove turns intersect and form therebetween a consecutive series of ridge turns defining a secondary surface level.

3. A method as claimed in claim 1 comprising forming between each groove torn a peaked ridge and subsequently to the formation thereof, planing the peaked ridge to define said plateau.

4. A method as claimed in claim 1 comprising defining a cutting datum relative to the rotation axis as a function of angular and longitudinal position, forming the helical groove such that a floor of the helical groove of each turn follows the datum, and defining the plateau relative to the datum.

5. A method as claimed in claim 4 comprising varying the radial position of the cutting datum as a function of longitudinal position to define tapering or barreling of the piston.

6. A method as claimed in claim 1 wherein the piston body material is removed by planing and comprising planing a ridge plateau displaced longitudinally from the current groove turn.

7. A method as claimed in claim 6 wherein the piston body material is removed by planing and comprising planing the ridge formed by the preceding two groove turns.

8. A method as claimed in claim 1 wherein the piston body material is removed by planing and comprising planing each ridge turn plateau flat in the longitudinal direction and substantially parallel to the longitudinal axis.

* * * * *

UNITED STATES PATENT AND TRADEMARK OFFICE
CERTIFICATE OF CORRECTION

| | | |
|---|---|---|
| PATENT NO. | : 7,086,152 B2 | Page 1 of 1 |
| APPLICATION NO. | : 10/399028 | |
| DATED | : August 8, 2006 | |
| INVENTOR(S) | : Jon Cadamarteri and Stuart Andrew Allan | |

It is certified that error appears in the above-identified patent and that said Letters Patent is hereby corrected as shown below:

Column 1, line 18: "the light" should be --a ligut--.

Column 7, line 30: "thereby centred" should be --thereby centered--.

Signed and Sealed this

Sixth Day of March, 2007

JON W. DUDAS
*Director of the United States Patent and Trademark Office*